US012214232B1

(12) United States Patent
Kinzer et al.

(10) Patent No.: US 12,214,232 B1
(45) Date of Patent: Feb. 4, 2025

(54) POWERED AIR-PURIFYING RESPIRATOR CARRIAGE AND ASSEMBLY

(71) Applicant: E.D. Bullard Company, Cynthiana, KY (US)

(72) Inventors: Paul A. Kinzer, Georgetown, KY (US); William Chad Wedding, Lexington, KY (US); Marcus Landon Borders, Lexington, KY (US); Jonathan Scott Fisher, Lexington, KY (US)

(73) Assignee: E.D. Bullard Company, Cynthiana, KY (US)

( * ) Notice: Subject to any disclaimer, the term of this patent is extended or adjusted under 35 U.S.C. 154(b) by 840 days.

(21) Appl. No.: 17/358,227

(22) Filed: Jun. 25, 2021

Related U.S. Application Data

(60) Provisional application No. 63/044,479, filed on Jun. 26, 2020.

(51) Int. Cl.
*A62B 7/10* (2006.01)
*A62B 9/04* (2006.01)

(52) U.S. Cl.
CPC . *A62B 7/10* (2013.01); *A62B 9/04* (2013.01)

(58) Field of Classification Search
CPC .... A62B 7/10; A62B 7/12; A62B 9/04; A62B 9/06; A62B 17/001; A62B 17/006;
(Continued)

(56) References Cited

U.S. PATENT DOCUMENTS 7,819,120 B2 * 10/2010 Taylor .................... A62B 25/00 128/206.28
8,230,852 B2 * 7/2012 Zhang .................. A62B 18/003 128/204.15

(Continued)

FOREIGN PATENT DOCUMENTS

KR 20130006602 U * 11/2013
KR 20200074823 A * 6/2020

(Continued)

OTHER PUBLICATIONS

3M BPK-01 Manual (https://multimedia.3m.com/mws/media/9979350/userinstruction-poweredsuppliedair-versaflo-bpk-01.pdf dated Sep. 22, 2015). (Year: 2015).*

*Primary Examiner* — Kendra D Carter
*Assistant Examiner* — Jaeick Jang
(74) *Attorney, Agent, or Firm* — Stites & Harbison, PLLC; David W. Nagle, Jr.; Gary N. Stewart

(57) ABSTRACT

A powered air-purifying respirator (PAPR) carriage and assembly includes: a blower assembly configured to draw in and purify ambient air; a power source operably connected to the blower assembly; and a carriage, which is configured to be worn by a user and to receive and carry the blower assembly and the power source. The carriage includes a main body that is configured to be worn on the shoulders of the user and includes a first cavity for receiving the power source and a second cavity for receiving the blower assembly. The first cavity and the second cavity are defined by portions of the main body positioned on opposing anterior and posterior sides of the user when worn. When the PAPR carriage and assembly is in use, the carriage thus causes the weight of the blower assembly and the power source to be distributed across the upper body of the user in a counter-balanced manner.

18 Claims, 9 Drawing Sheets

(58) Field of Classification Search
CPC ......... A62B 17/04; A62B 23/00; A62B 23/02; A62B 18/08; A62B 18/084; A62B 18/006; A62B 25/00; B63C 2011/026; A61M 16/0066
See application file for complete search history.

(56) References Cited

U.S. PATENT DOCUMENTS

| | | | | |
|---|---|---|---|---|
| RE46,888 | E * | 6/2018 | Tilley | G11C 16/0483 |
| 2006/0048782 | A1* | 3/2006 | Gossweiler | A62B 23/02 128/205.12 |
| 2012/0227209 | A1* | 9/2012 | Vinson | A47L 5/36 224/259 |
| 2013/0206806 | A1* | 8/2013 | Hu | A45F 3/005 224/660 |
| 2017/0100613 | A1 | 4/2017 | Chessari et al. | |
| 2017/0189727 | A1* | 7/2017 | Hunter | A62B 18/006 |
| 2019/0030378 | A1* | 1/2019 | Zhu | A62B 25/00 |
| 2021/0298370 | A1* | 9/2021 | Watters | A41D 13/0025 |

FOREIGN PATENT DOCUMENTS

| | | | | |
|---|---|---|---|---|
| TW | M539357 | U | 4/2017 | |
| WO | WO-2019077549 | A2 * | 4/2019 | A45F 3/14 |
| WO | 2019/207304 | A1 | 10/2019 | |
| WO | WO-2020182982 | A1 * | 9/2020 | A45F 3/06 |

* cited by examiner

POWERED AIR-PURIFYING RESPIRATOR CARRIAGE AND ASSEMBLY

CROSS-REFERENCE TO RELATED APPLICATIONS

The present application claims priority to U.S. Patent Application Ser. No. 63/044,479 filed on Jun. 26, 2020, the entire disclosure of which is incorporated herein by reference.

BACKGROUND OF THE INVENTION

The present invention relates to a powered air-purifying respirator (PAPR), which filters and removes contaminants from ambient air and then delivers breathable air to a headpiece worn by a user, such as a hood or mask, via a breathing tube.

In a typical PAPR, a blower assembly includes a centrifugal fan (or impeller) that is driven by a motor to draw in ambient air through an air-purifying filter, such as a High Efficiency Particulate Air (HEPA) filter, or a gas cartridge. Such filters or cartridges remove contaminants, with breathable air then being delivered to a headpiece worn by the user. In most cases, the blower assembly and power source of the PAPR is mounted on a belt that is worn around the waist of a user, with such components often positioned to an isolated area behind the user (typically near the small of the back). However, such belts are often cumbersome and uncomfortable. Thus, there remains a need for improvements in how PAPRs are worn by a user.

SUMMARY OF THE INVENTION

The present invention is a powered air-purifying respirator (PAPR) carriage and assembly.

An exemplary PAPR carriage and assembly made in accordance with the present invention includes: a blower assembly configured to draw in and purify ambient air; a power source operably connected to the blower assembly; and a carriage, which is configured to be worn by a user and to receive and carry the blower assembly and the power source.

The carriage includes a main body that is configured to be worn on the shoulders of the user. The main body includes: a front portion, which defines a first cavity for receiving the power source; a rear portion that is positioned opposite of the front portion and defines a second cavity for receiving the blower assembly; a left side portion extending between the front portion and the rear portion; and a right side portion positioned opposite of the left side portion and extending between the front portion and the rear portion. The front portion, rear portion, left side portion, and the right side portion of the main body collectively define a central opening for accommodating the head of the user. When the carriage is worn, the front portion and the rear portion of the main body, and thus the first cavity and second cavity defined thereby, are positioned on opposing anterior and posterior sides of the user, while the left side portion rests on one shoulder of the user and the right side portion rests on another shoulder of the user. Accordingly, when the PAPR assembly is in use, the blower assembly and the power source are positioned on opposing anterior and posterior sides of the user. In this way, the carriage thus causes the weight of the blower assembly and power source to be distributed across the upper body of the user in a counter-balanced manner.

In some embodiments, the main body includes a break in one of the side portions of the main body, such that the side portion with the break includes a first section and a second section, to provide an additional means of donning (positioning on) or doffing (removing) the main body. In such embodiments, the main body is flexible, such that the distance between the first section and the second section of the side portion provided with the break can be selectively adjusted to increase the width of the break and receive the neck of the user. In some embodiments, the main body includes a locking mechanism which can be selectively engaged to connect and disconnect the first section and the second section across the break.

In some embodiments, the PAPR assembly may further include a power source housing that is selectively installed within the first cavity defined by the front portion of the main body and in which the power source is housed while the PAPR assembly is in use. In some embodiments, the power source housing includes a control which can be selectively engaged to control operation of the blower assembly. In one such embodiment, the front portion of the main body defines a first opening configured to permit entry of the power source housing into the first cavity and a second opening through which the control of the power source housing can be accessed.

To facilitate mounting of the blower assembly within the second cavity defined by the rear portion of the main body, in some embodiments, the carriage further includes a cradle which is removably mounted to the rear portion of the main body. The cradle includes a slot and one or more cuffs which enable the blower assembly to be selectively snap-fit to the cradle.

In some embodiments, the carriage further includes a pair of straps configured to secure the main body around the torso of the user.

DETAILED DESCRIPTION OF THE INVENTION

The present invention is a powered air-purifying respirator (PAPR) carriage and assembly.

Figure 1A:
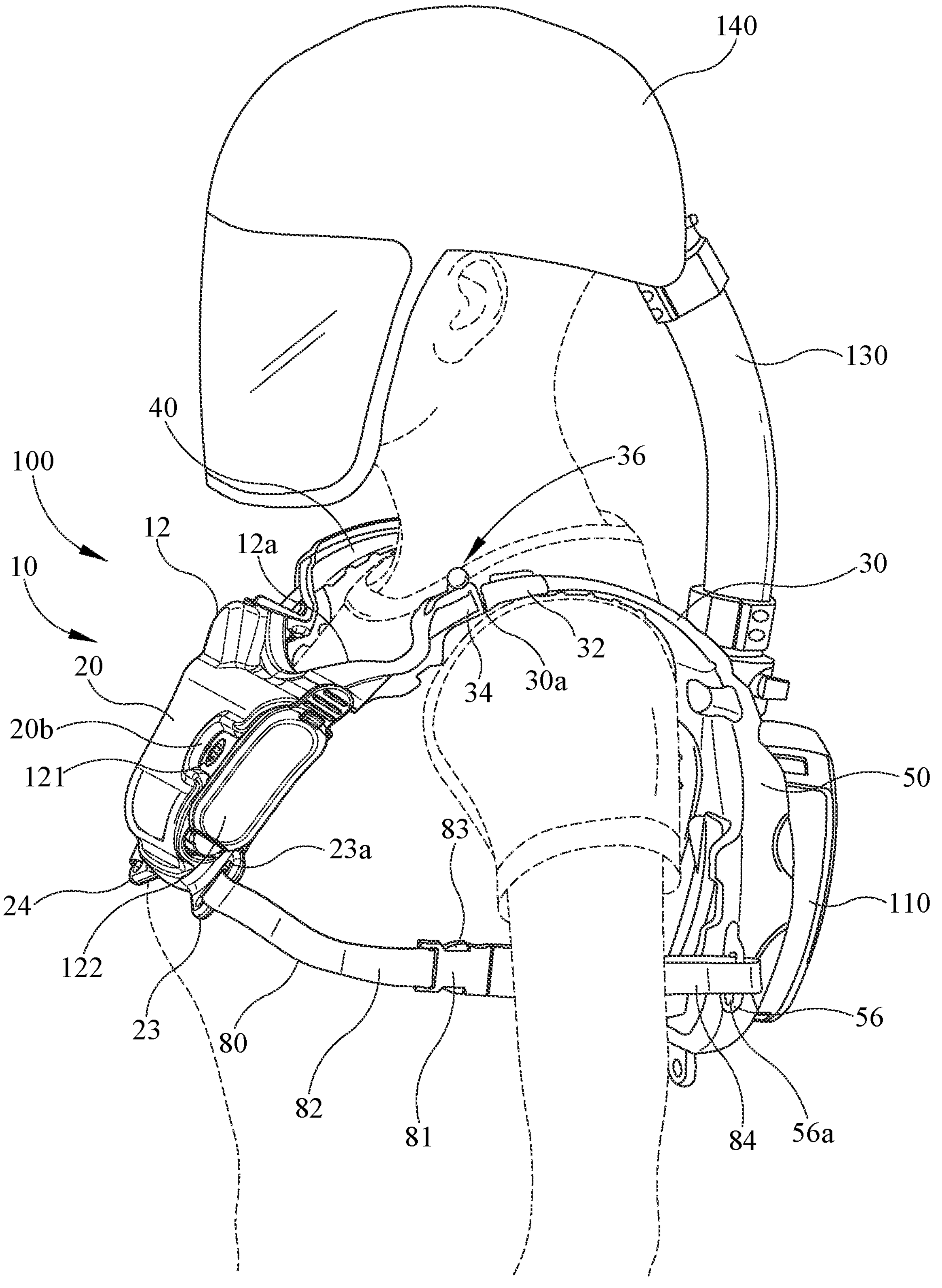
FIG. 1A is a perspective view of an exemplary PAPR carriage and assembly made in accordance with the present invention being worn by a user.
Figure 1B:
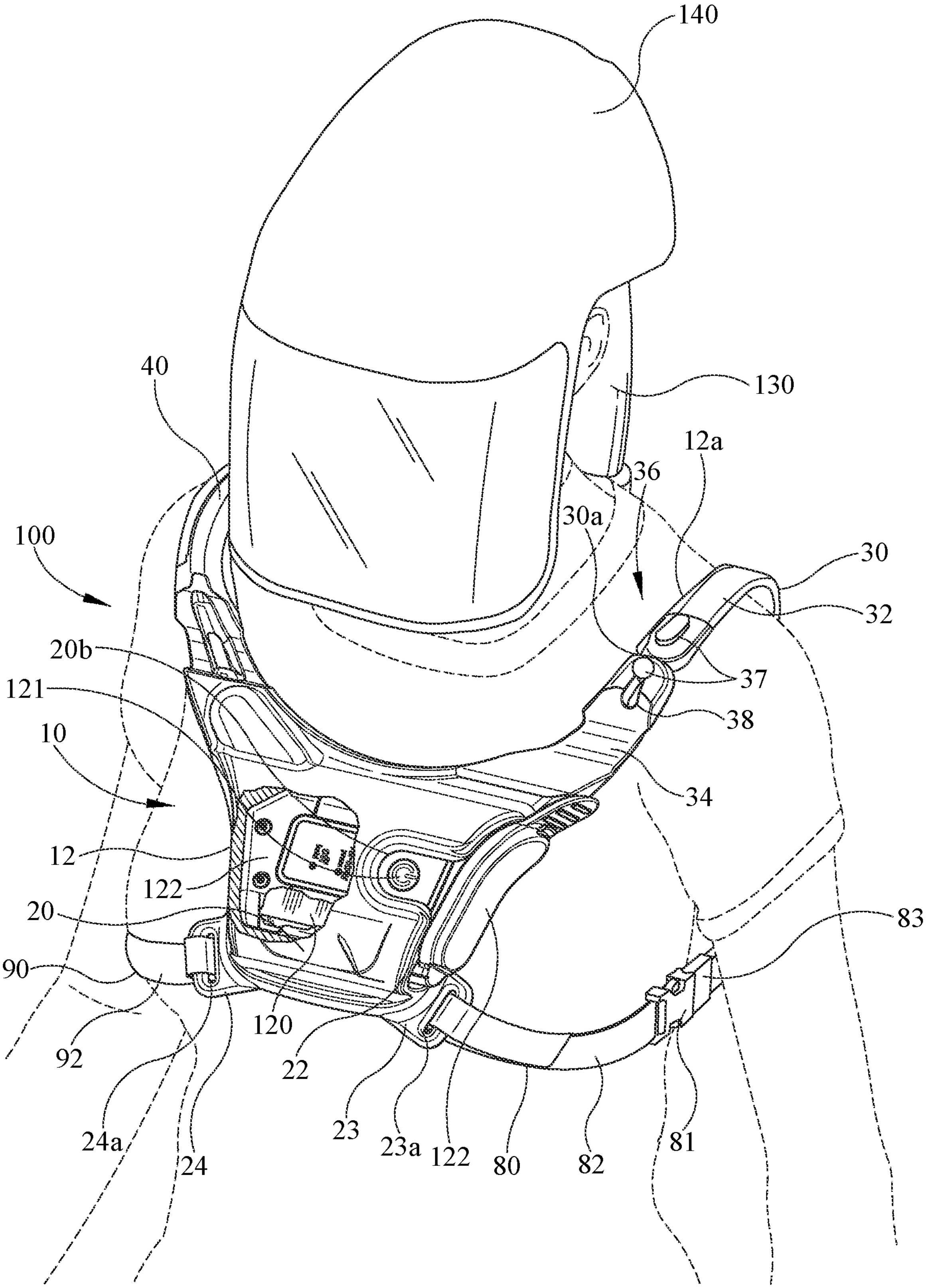
FIG. 1B is another perspective view of the exemplary PAPR carriage and assembly of FIG. 1A being worn by a user.
Figure 1C:
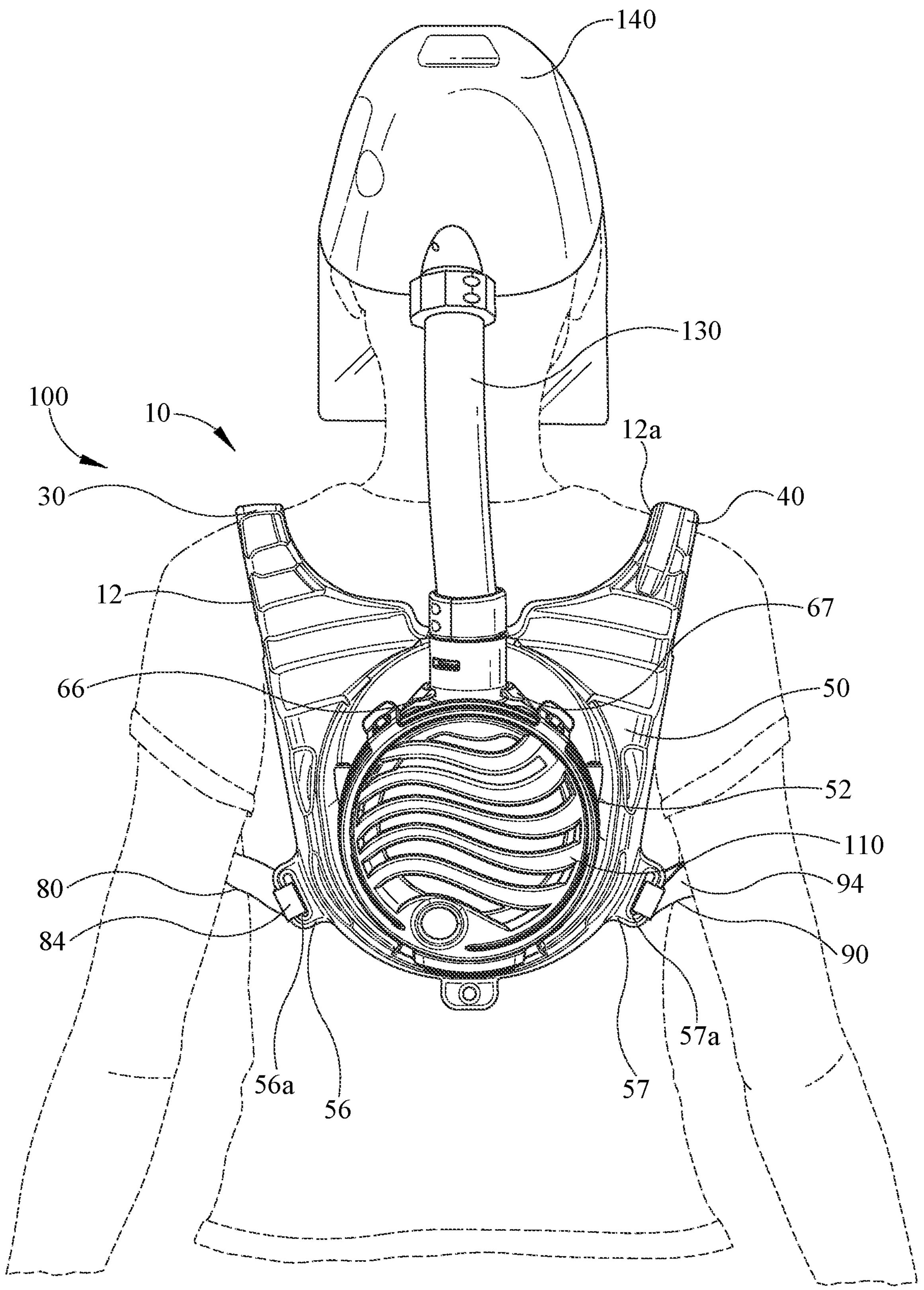
FIG. 1C is a rear view of the exemplary PAPR carriage and assembly of FIG. 1A being worn by a user.

FIGS. 1A, 1, and 1C are various perspective views of an exemplary PAPR carriage and assembly 100 made in accordance with the present invention.

Figure 2:
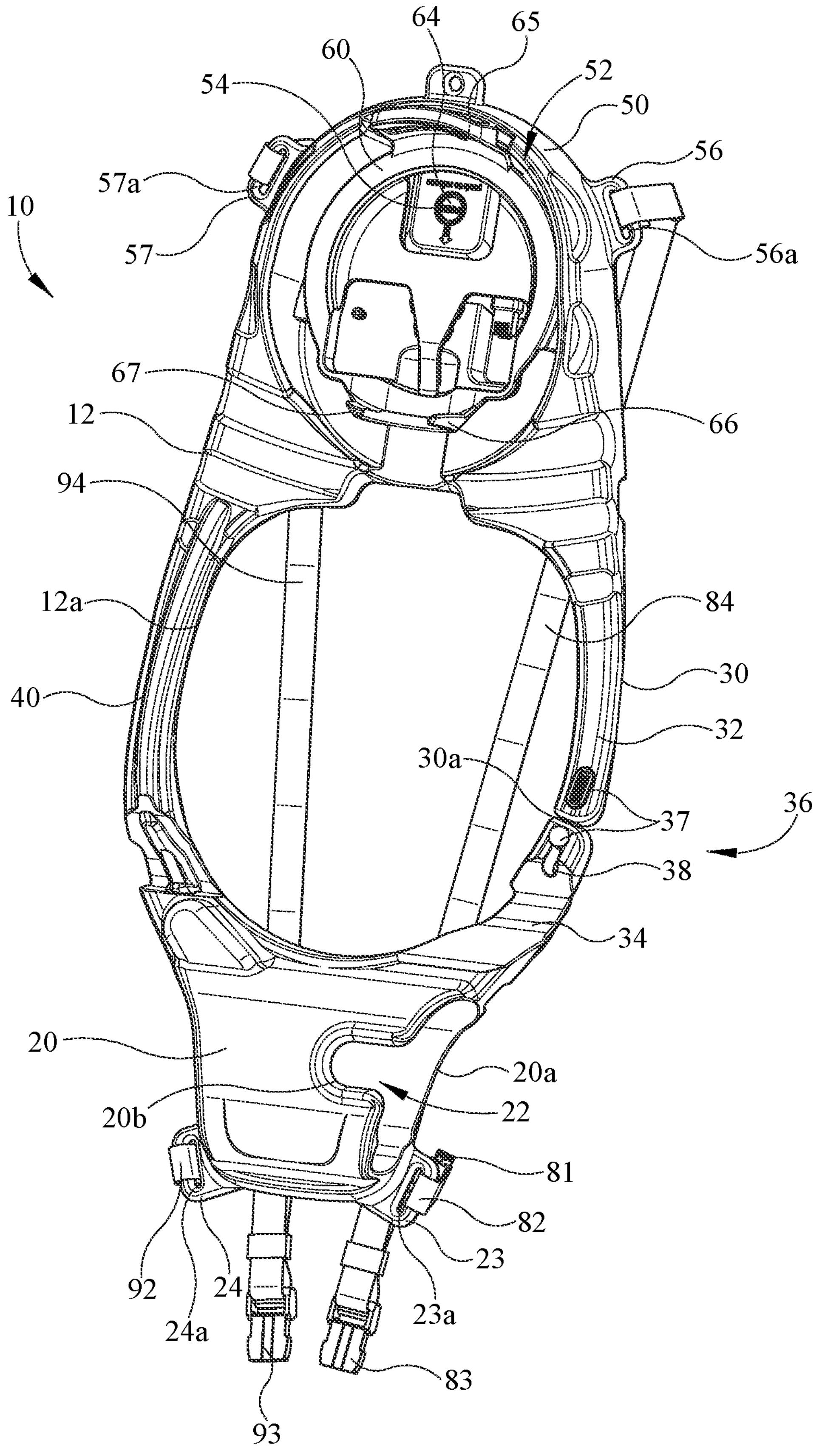
FIG. 2 is a perspective view of the carriage of the exemplary PAPR carriage and assembly of FIG. 1A in isolation.

FIG. 2 is a perspective view of the carriage 10 of the exemplary PAPR carriage and assembly 100 in isolation.

As shown in FIGS. 1A-C and 2, in this exemplary embodiment, the PAPR carriage and assembly 100 includes: a blower assembly 110 configured to draw in and purify ambient air; a power source 120 (FIG. 3) operably connected to the blower assembly 110; and the carriage 10, which is configured (i) to be worn by a user, and (ii) to receive and carry the blower assembly 110 and power source 120. The carriage 10 includes a main body 12, which is formed to drape over the shoulders of a user when worn so that the weight of the blower assembly 110 and the power source 120 is borne by the shoulders of the user. The main body 12 defines, and thus can be characterized as including, a first cavity 22 in which the power source 120 is received and a second cavity 52 in which the blower assembly 110 is received. The first cavity 22 and the second cavity 52 are located at opposing portions of the main body 12, such that, when the PAPR carriage and assembly 100 is assembled and the carriage 10 is worn (i.e., the PAPR carriage and assembly 100 is in use), the blower assembly 110 and the power source 120 are positioned on opposing anterior and posterior sides of the user, as best shown in FIG. 1A. Accordingly, in use, the carriage 10 causes the weight of the blower assembly 110 and the power source 120 of the PAPR carriage and assembly 100 to be borne by and distributed across the upper body of the user in a counterbalanced manner as opposed to being isolated to a single area around the waist of the user, as is generally the case of belt-based PAPRs of known construction.

Referring again to FIGS. 1A-C, in this exemplary embodiment, the PAPR carriage and assembly 100 is operably connected to a headpiece 140 by a breathing tube 130, such that breathable air generated by the blower assembly 110 is directed to the headpiece 140 via the breathing tube 130. In this case, the headpiece 140 is only partially covers the user's head. It is appreciated, however, that other headpiece types or designs (hoods, masks, etc.) that are designed to provide the user with filtered air may alternatively be used without departing from the spirit or scope of the present invention.

Figure 4:
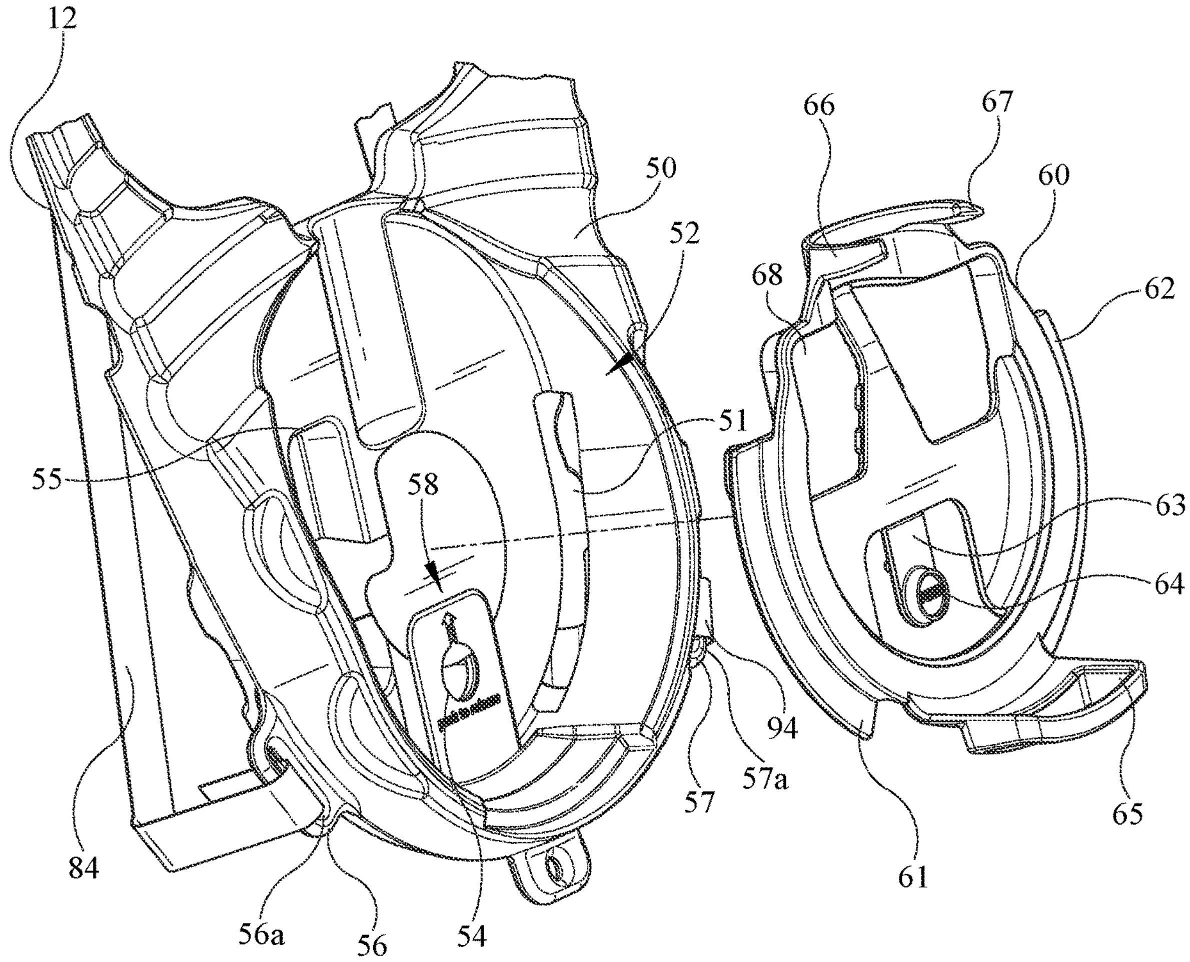
FIG. 4 is a partial exploded perspective view of a rear portion the carriage of FIG. 2.

FIG. 4 is a partial exploded perspective view of a rear portion of the carriage 10.

Figure 5A:
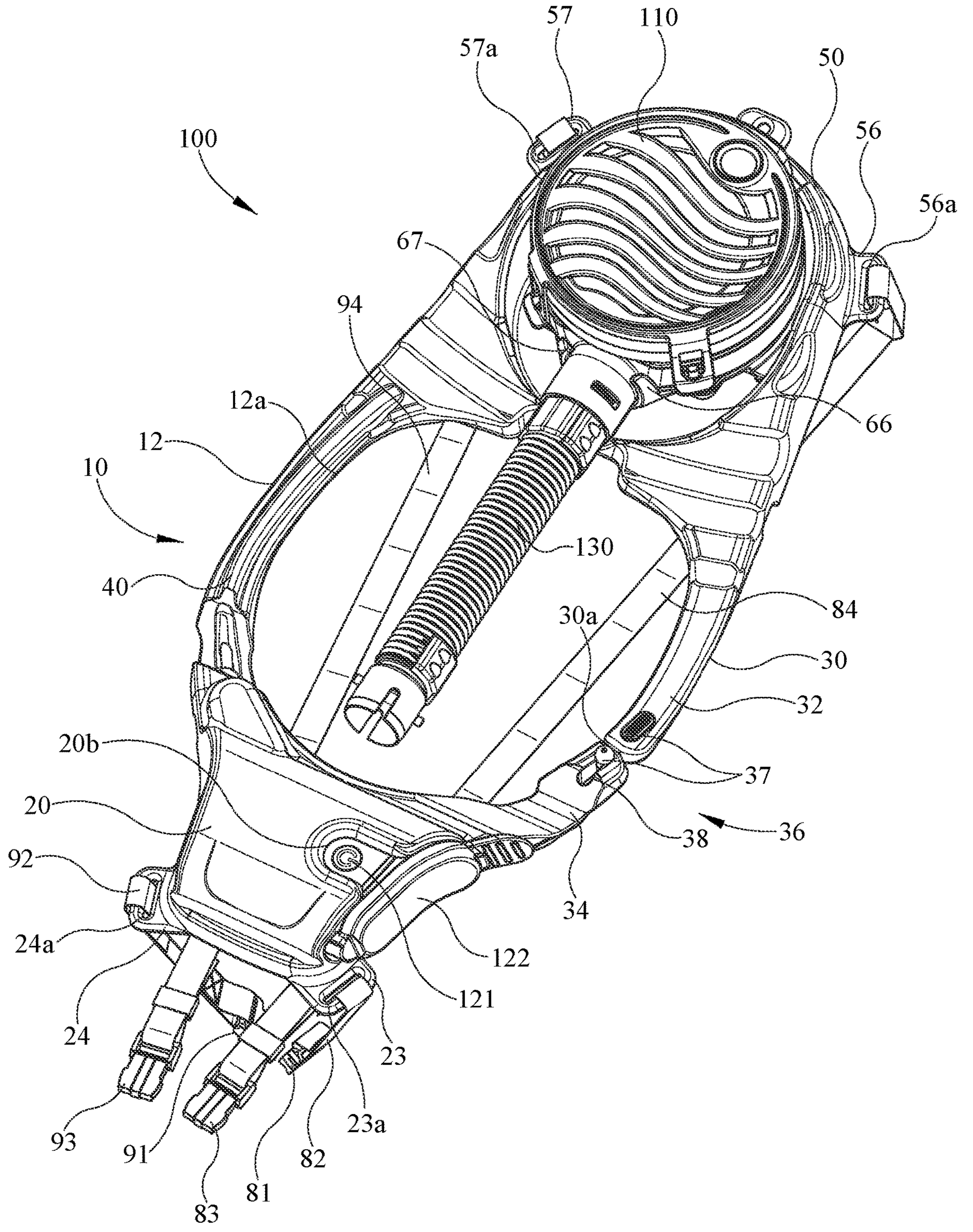
FIG. 5A is a perspective view of the exemplary PAPR carriage and assembly of FIG. 1A.
Figure 5B:
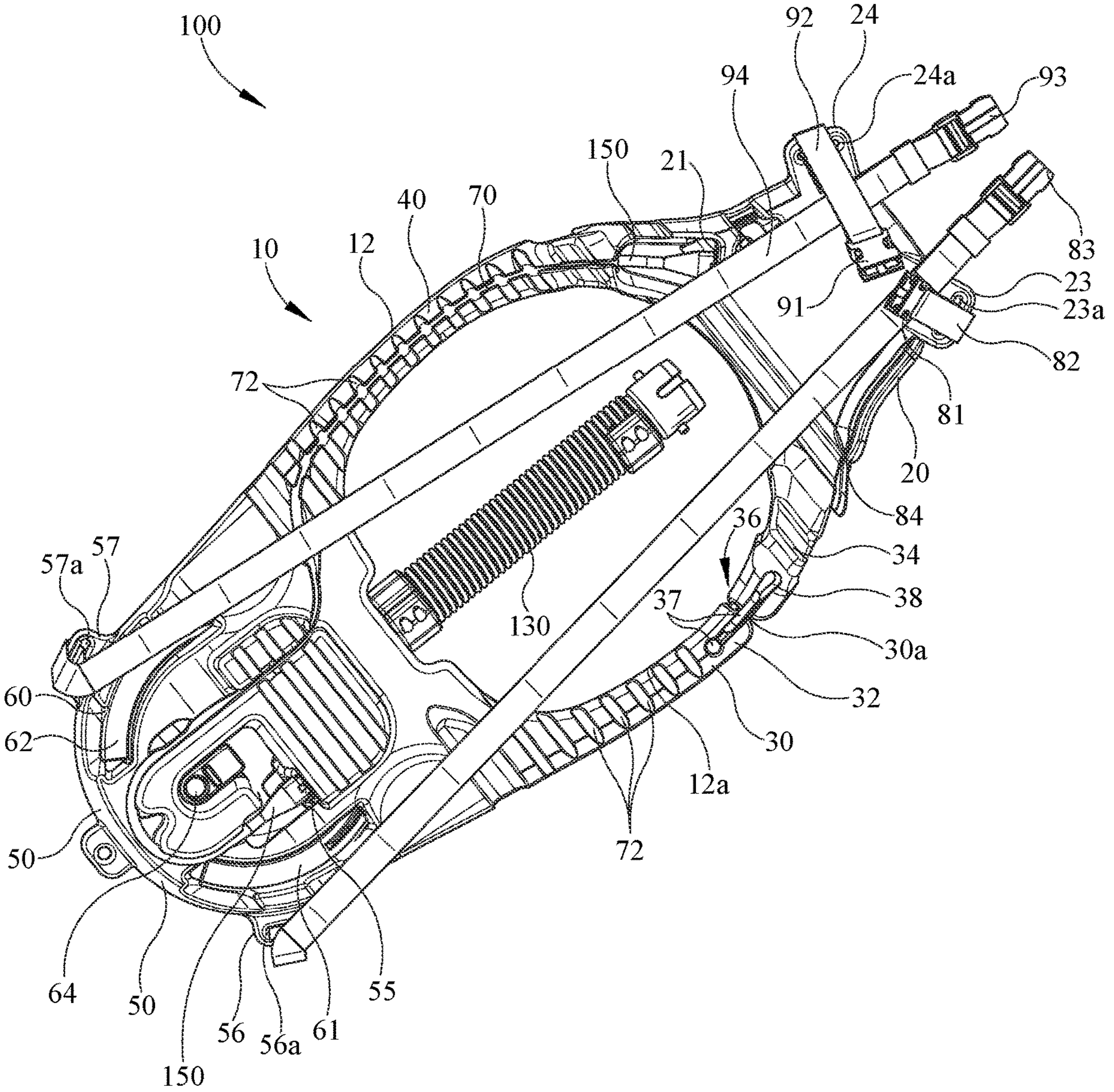
FIG. 5B is another perspective view of the exemplary PAPR carriage and assembly of FIG. 5A.

FIGS. 5A and 5B are additional perspective views of the PAPR carriage and assembly 100.

Referring now to FIGS. 1A-C, 2, 4, and 5A-B, the main body 12 of the carriage 10 is defined by, and thus can be characterized as including: a front portion 20; a rear portion 50 positioned opposite of the front portion 20; a left side portion 30, which extends between the front portion 20 and the rear portion 50; and a right side portion 40, which is positioned opposite of the left side portion 30 and extends between the front portion 20 and the rear portion 50. The front portion 20, the left side portion 30, the right side portion 40, and the rear portion 50 collectively define a central opening **12*a* for accommodating the head of a user. In this exemplary embodiment, the front portion 20, the left side portion 30, the right side portion 40, and the rear portion 50 are integrally formed, such that the main body 12 is of a unitary construction. As shown in FIGS. 1A-C, when the PAPR carriage and assembly 100 is in use, the neck and head of the user fits through the central opening 12*a* defined by the main body 12, with the respective left and right side portions 30, 40 of the main body 12 resting on the shoulders of the user. In this regard, the main body 12 is preferably made of a flexible material (e.g., ethylene vinyl acetate (EVA) or polyolefin foam), such that the weight of the main body 12 and any components mounted thereto or received and carried thereby cause the main body 12 to drape over the shoulders of the user as shown in FIGS. 1A-C. Alternative embodiments are, however, contemplated in which the main body 12** is made of a more rigid material, but is still formed (e.g., during manufacture) to drape over the shoulders of the user.

Figure 6A:
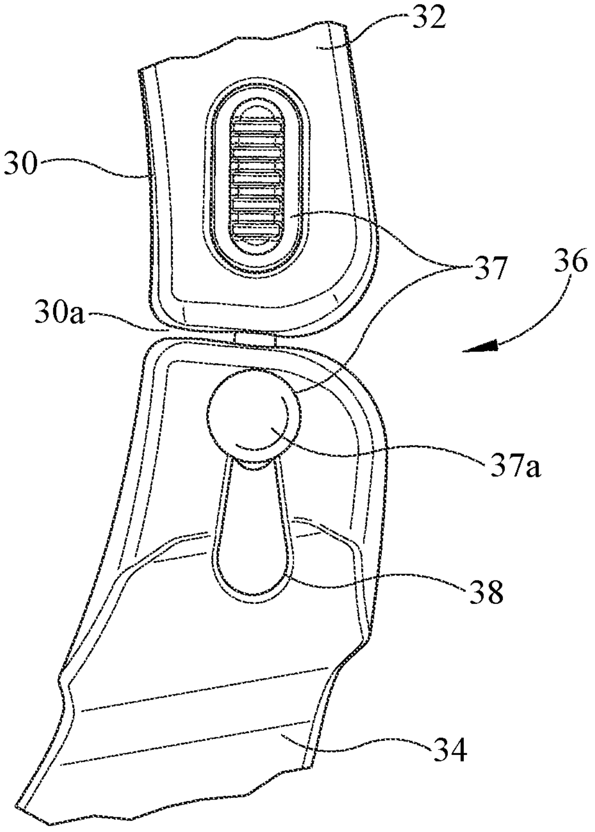
FIG. 6A is a partial enlarged front view of a left side portion of the carriage of FIG. 2.

FIG. 6A is a partial enlarged front view of the left side portion 30 of the carriage 12 of the PAPR carriage and assembly 100.

Figure 6B:
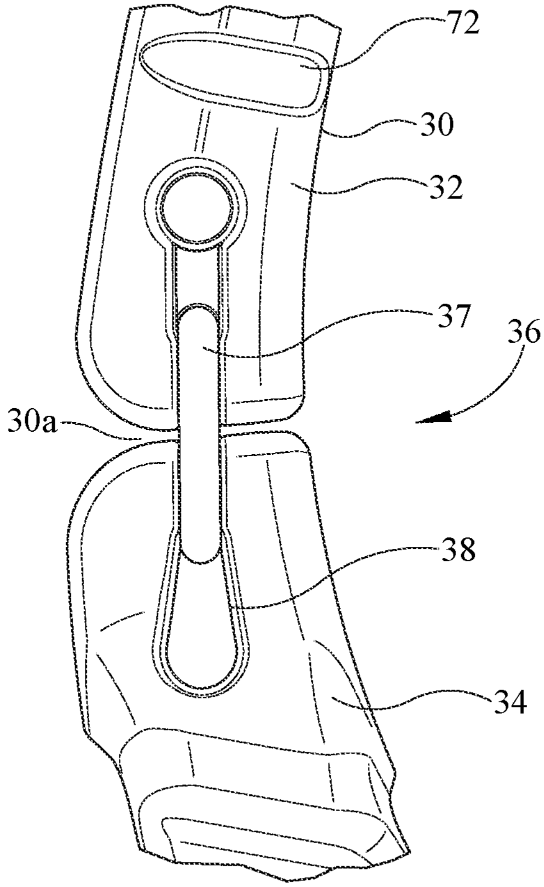
FIG. 6B is a partial enlarged rear view of a left side portion of the carriage of FIG. 2.

FIG. 6B is a partial enlarged rear view of the left side portion 30 of the carriage 12 of the PAPR carriage and assembly 100.

Referring now to FIGS. 1A, 1, 2, 5A-B, and 6A-B, although the central opening **12*a* defined by the main body 12 is sized to accommodate the head of the user, thereby enabling the main body 12 to be lowered onto the shoulders of the user, in this exemplary embodiment, the main body 12 also defines, and thus can be characterized as including, a break 30*a* in one of the respective left and right side portions 30, 40 of the main body 12 to provide an additional means of donning (positioning on) or doffing (removing) the main body 12, and thus the blower assembly 110 and power source 120. Specifically, in this exemplary embodiment, the break 30*a* is provided in the left side portion 30 of the main body 12, such that the left side portion 30 is effectively defined by, and thus can be characterized as including, a first section 32 and a second section 34. The material from which the main body 12 is constructed is sufficiently flexible, such that the user can selectively adjust the distance between the first section 32 and the second section 34 of the left side portion 30 (i.e., increase the width of the break 30*a*) and slide their neck into or out of the main body 12. Donning or doffing the main body 12 in the foregoing manner lessens the likelihood that any portion of the PAPR carriage and assembly 100 would contact the face of the user as the main body 12** is transitioned on or off the user, and, in this regard, may prove particularly advantageous in settings where hazardous substances are present and/or maintaining a sterilized environment is critical. Indeed, in a medical setting, medical professionals are trained to don and doff personal protective equipment (PPE) in such a manner to prevent PPE contact with their face.

Referring still to FIGS. 1A-B, 2, 5A-5B, and 6A-B, in this exemplary embodiment, the main body 12 further includes a locking mechanism 36 which can be selectively engaged to connect and disconnect the first section 32 and the second section 34 of the left side portion 30 across the break **30*a* of the left side portion 30 in order to transition the main body 12 between a locked and an unlocked configuration, respectively. In the locked configuration, as shown in FIGS. 1A-B, 2, 5A-B, and 6A-B, the locking mechanism 36 is engaged so that the width of the break 30*a* cannot be increased without first disengaging the locking mechanism 36. In the unlocked configuration, the locking mechanism 36 is disengaged, and the width of the break 30*a* can be freely adjusted. In this exemplary embodiment, the locking mechanism 36 includes a hook 37 and an opening 38. The hook 37 is fixed to the first section 32 of the left side portion 30, and the second section 34 of the left side portion 30 defines the opening 38. When the locking mechanism 36 is engaged to place the main body 12 in the locked configuration, the hook 37 extends across the break 30*a* and engages the opening 38. In this exemplary embodiment, the distal end of the hook 37 has an enlarged head 37***a*, such that it can be inserted into (or removed from) the opening 38 at a distal end (relative to the break 30*a*) of the opening 38, but is locked in place at a proximal end (relative to the break 30*a*) of the opening 38, as best shown in FIG. 6A. In this regard, the opening 38 thus tapers as it extends toward the break 30*a*. Accordingly, in use, once the locking mechanism 36 is engaged, the weight of the PAPR carriage and assembly 100 biases the hook 37 toward the narrower, proximal end of the opening 38, thereby ensuring the main body 12 does not inadvertently transition to the unlocked configuration while the PAPR carriage and assembly 100 is in use. Of course, to disengage the locking mechanism 36 and transition the main body 12 to the unlocked configuration, the user need only to push the enlarged head 37*a* of the hook 37 downward and through the distal end of the opening 38.

Of course, the hook 37 and opening 38 combination described above is but one example of a locking mechanism suitable for connecting the first section 32 and the second section 34 of the left side portion 30 of the main body 12 across the break 30*a*, and various other means may be employed to connect the same without departing from the spirit and scope of the present invention. For example, in an alternative embodiment, the locking mechanism 36 may include a latch (not shown) mounted for rotation with respect to one section of the left side portion 30 and a notch that is defined by the other section of the left side portion 30, where the notch is configured to receive a portion of the latch. In such embodiment, the latch can be selectively rotated between a first position, in which a portion of the latch is received within the notch and the break 30*a* is closed, and a second position, in which the latch is not engaged with the notch and the break 30*a* is open.

Figure 3:
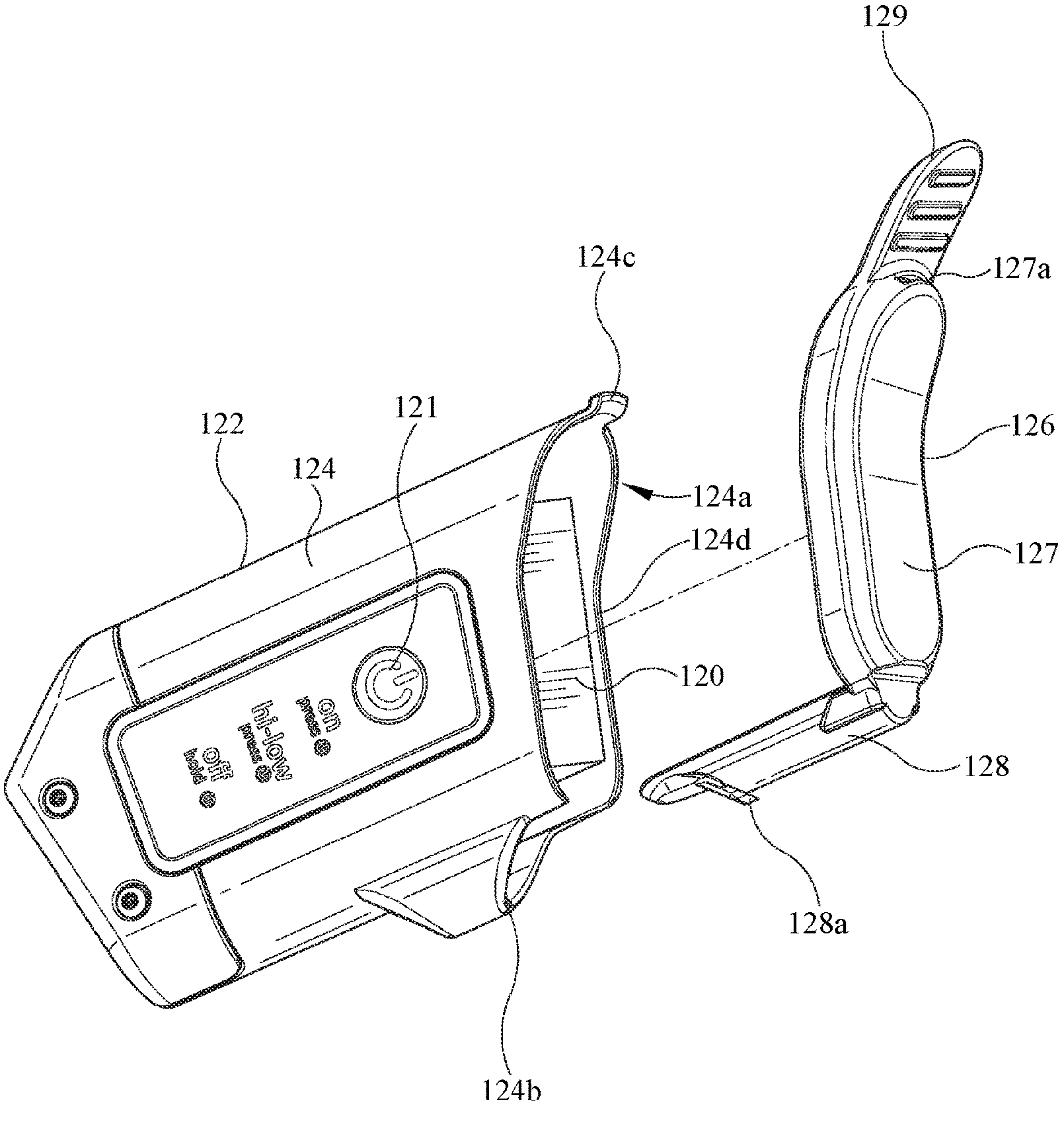
FIG. 3 is a perspective view of a power source and power source housing of the exemplary PAPR carriage and assembly of FIG. 1A.

FIG. 3 is a perspective view of the power source 120 and a power source housing 122 of the exemplary PAPR carriage and assembly 100.

Referring now to FIGS. 1A, 1, 2, 3, and 5A, when the exemplary PAPR carriage and assembly 100 is worn by a user, the front portion 20 of the main body 12 is positioned adjacent to the chest (i.e., in front) of the user. The front portion 20 defines the first cavity 22 for receiving the power source 120, which, in this case, is a battery. In this exemplary embodiment, the PAPR carriage and assembly 100 further includes a power source housing 122 in which the power source 120 (battery) is housed. The power source housing 122 is selectively installed within the first cavity 22. Thus, when the PAPR carriage and assembly 100 is in use, the power source housing 122 is received within, but can be selectively removed from, the first cavity 22. Accordingly, because the first cavity 22 is positioned adjacent to the user's chest when the PAPR carriage and assembly 100 is in use, the user can readily access the power source housing 122, and thus the power source 120 housed therein. As shown best in FIGS. 1B and 5A, to limit movement of the power source housing 122 within the first cavity 22, while still enabling the user to open and close a door 126 of the power source housing 122, in this exemplary embodiment, the dimensions of the first cavity 22 are such that the power source housing 122 is substantially received within the first cavity 22, except for the door 126.

Referring still to FIGS. 1A, 1, 2, 3, and 5A, the power source housing 122 includes the electrical components and circuitry necessary to control operation of, and connect the power source 120 to, the blower assembly 110. In this regard, the power source housing 122 includes an electrical connector (e.g., a DIN-style or RJ45-style connector) which provides an interface to which electrical wiring 150 (FIG. 5B) for operably connecting the blower assembly 110 and power source housing 122 is connected, as further described below. The power source housing 122 also includes a control 121, which can be selectively engaged by a user to control operation of the blower assembly 110. Specifically, for ease of use, in this exemplary embodiment, the control 121 is a single button, which can be selectively engaged to turn the blower assembly 110 on or off, or to adjust the fan speed of the blower assembly 110. In this regard, and as shown in FIG. 3, the control 121 can be initially pressed to activate (or "turn on") the blower assembly 110, subsequently pressed to alternate between high and low fan speeds for the blower assembly 110, and held for a predetermined time to deactivate (or "turn off") the blower assembly. Accordingly, in this exemplary embodiment, all user-based operation of the blower assembly 110 can be performed using a single control.

Referring specifically to FIG. 3, in this exemplary embodiment, the power source housing 122 for the power source 120 includes: a body 124, which defines a cavity 124*a* in which the power source 120 is received; and a door 126 which can be transitioned between (i) an open position to provide access to the cavity 124*a* to allow insertion and removal of the power source 120, and (ii) a closed position to restrict access to the cavity 124*a*. In this exemplary embodiment, the door 126 defines, and thus can be characterized as including, a cover portion 127 and an arm portion 128. The cover portion 127 is configured to cover an open end 124*d* of the body 124 which provides access to the cavity 124*a*. The arm portion 128 is configured to be inserted into a channel 124*b* defined by the body 124 of the power source housing 122 to maintain the door 126 in association with the body 124 of the power source housing 122 while the PAPR carriage and assembly 100 is in use. In this exemplary embodiment, the cover portion 127 and the arm portion 128 are constructed of a flexible material integrally formed together in a manner which permits the cover portion 127 and/or arm portion 128 to bend as the cover portion 127 is pulled away from the open end 124*d* of the body 124. In other words, the construction of the door 126 and the use of a flexible material creates a hinge between the cover portion 127 and the arm portion 128.

Referring still to FIG. 3, in this exemplary embodiment, the arm portion 128, defines, and thus can be characterized as including, a protrusion 128*a*, which is biased toward an extended position away from the main body of the arm portion 128. Although biased away from the main body of the arm portion 128, the protrusion 128*a* is sufficiently flexible so that the protrusion 128*a* is urged toward the main body of the arm portion 128 as the arm portion 128 is guided through the channel 124*b*. Once the protrusion 128*a* of the arm portion 128 has passed completely through the channel 124*b*, the protrusion 128*a* of the arm portion 128 returns to the extended position, such that the protrusion 128*a* will catch on a lip of the channel 124*b*, which prevents the arm portion 128 from inadvertently passing back through the channel 124*b*. The protrusion 128*a* can, however, be urged toward the main body of the arm portion 128 and the arm portion 128 pulled to move the arm portion 128 back through the channel 124*b* if it is desired to completely disassociate the door 126 from the body 124 of the power source housing 122 (e.g., for decontamination or cleaning).

Referring still to FIG. 3, to prevent the door 126 from inadvertently transitioning to an open position while the PAPR carriage and assembly 100 is in use, in this exemplary embodiment, the body 124 of the power source housing 122 further defines, and thus can be characterized as further including, a tab 124*c* which passes through a slot 127*a* defined by the cover portion 127 of the door 126. Accordingly, to transition the door 126 from a closed to open position, the user must pull on the cover portion 127 to overcome the frictional fit between the tab 124*c* and the slot 127*a*. To assist the user in overcoming such frictional fit, in this exemplary embodiment, the door 126 further defines, and thus can be characterized as further including, a handle 129 that is integrally formed with and extends from the cover portion 127.

Referring again to FIGS. 1A-B, 2, 3, and 5A, the front portion 20 of the main body 12 defines a first opening 20*a* which permits entry of the power source housing 122 into the first cavity 22, and a second opening 20*b* which provides the user access to the control 121 of the power source housing 122 while the PAPR carriage and assembly 100 is in use. Therefore, instead of the user having to reach behind their back to control operation of the blower assembly 110, as is common in belt-based PAPRs of known construction, the user can control operation of the blower assembly 110 by engaging a portion of the PAPR carriage and assembly 100 that is readily accessible to the user. In this exemplary embodiment, the second opening 20*b* is defined, at least in part, by a break within an edge of the front portion 20 of the main body 12 that defines the first opening 20*a*. Of course, the second opening 20*b* may be alternatively positioned relative to the first opening 20*a* or alternatively defined by the front portion 20 of the main body 12 without departing from the spirit or scope of the present invention.

Referring now to FIGS. 1C, 2, 4, and 5A, the rear portion 50 of the main body 12 defines the second cavity 52 for receiving the blower assembly 110, which includes a centrifugal fan (or impeller) that is driven by a motor to draw in ambient air through an air-purifying filter, such as a High Efficiency Particulate Air (HEPA) filter, or gas cartridge. A blower assembly 110 suitable for use in the PAPR carriage and assembly 100 includes, but is not necessarily limited to, that described in commonly assigned U.S. Patent Application Ser. No. 63/053,821, which is incorporated herein by reference.

Referring specifically to FIGS. 2 and 4, to facilitate mounting of the blower assembly 110 within the second cavity 52, the carriage 10 further includes a cradle 60 which is removably mounted to the rear portion 50 of the main body 12 and is configured to receive and maintain the blower assembly 110 within the second cavity 52 while the PAPR carriage and assembly 100 is in use. In this exemplary embodiment, the cradle 60 includes two lateral flanges 61, 62 which are configured to slide into and engage two corresponding slots 51 (one of which is visible in FIG. 4) defined by the rear portion 50 of the main body 12 to mount the cradle 60 to the rear portion 50 of the main body 12 within the second cavity 52. In this exemplary embodiment, the cradle 60 also includes a tab 63 which can be selectively inserted into a corresponding slot 58 defined by the rear portion 50 of the main body 12 for another point of engagement. The distal end of the tab 63 of the cradle 60 includes a button 64 with a circumferential rim. In this exemplary embodiment, the tab 63 of the cradle 60 is sufficiently flexible, such that, as the tab 63 of the cradle 60 is inserted into the corresponding slot 58 defined by the rear portion 50 of the main body 12, the tab 63 is urged backward until the button 64 passes through a corresponding opening 54 defined by the rear portion 50 of the main body 12, thereby locking the tab 63 of the cradle 60 in the slot 58. The button 64 can be pressed down to move the button 64 out of engagement with the corresponding opening 54 to enable the tab 63 to be withdrawn from the corresponding slot 58. In short, in this exemplary embodiment, the cradle 60 can be readily mounted to or removed from the rear portion 50 of the main body 12 by engaging or disengaging the two lateral flanges 61, 62 and tab 63 of the cradle 60 with respect to the corresponding slots 51, 58 of the rear portion 50 of the main body 12.

Referring now to FIGS. 1C, 2, 4, and 5A, in this exemplary embodiment, the cradle 60 is constructed so that the blower assembly 110 can be selectively snap-fit thereto. In this regard, the cradle 60 defines a slot 65 for receiving a first portion of the blower assembly 110, i.e., a lower portion of the housing of the blower assembly 110. The cradle 60 also includes integral cuffs 66, 67, which collectively define a substantially circular cavity for receiving a second portion of the blower assembly, i.e., a tubular extension of the blower assembly 110. In this case, in the tubular extension is the portion of the blower assembly that is configured for connection to the breathing tube 130, as best shown in FIGS. 1C and 5A. A breathing tube 130 suitable for use with the PAPR carriage and assembly 100 of the present invention, includes, but is not necessarily limited to, that disclosed in U.S. Patent Application Ser. No. 63/053,821, which, again, is incorporated herein by reference. In any event, the cuffs 66, 67 are sufficiently flexible as to permit insertion and removal of the tubular extension of the blower assembly 110 into and out of the substantially circular cavity. Thus, the blower assembly 110 can be selectively snap-fit into the cradle 60 by inserting a first portion of the housing of the blower assembly 110 into the corresponding slot 65, and then rocking the blower assembly 110 so that the tubular extension is inserted into the substantially circular cavity defined by the cuffs 66, 67. Conversely, the blower assembly 110 can be readily disassociated from the cradle 60 (e.g., for decontamination or cleaning) by rocking the blower assembly 110 so that the tubular extension is withdrawn from the substantially circular cavity defined by the cuffs 66, 67, and then withdrawing the first portion of the blower assembly 110 out of the slot 65.

In an alternative embodiment, the cradle 60 may define integral spring fingers, with the above-described cuffs 66, 67 positioned at the respective distal ends of the spring fingers. In such embodiment, the spring fingers are configured to flex and accommodate movement of the cuffs 66, 67 to allow for insertion and removal of the tubular extension of the blower assembly 110 from the cradle 60.

Referring specifically to FIG. 5B, the blower assembly 110 and power source 120 are operably connected by electrical wiring 150 to facilitate control of the blower assembly 110 in the manner described above. In this regard, like the power source housing 122, the blower assembly 110 also includes an electrical connector (e.g., DIN-style connector or RJ45-style connector) that provides an interface to which the electrical wiring 150 is connected. To enable connection of the electrical wiring 150 to the electrical connectors of the power source housing 122 and the blower assembly 110, the front portion 20 and the rear portion 50 of the main body 12 each define a port 21, 55 which facilitates connection between a terminal end of the electrical wiring 150 and the electrical connectors of the power source housing 122 and the blower assembly 110, respectively. To this end, the cradle 60 also defines an opening 68 (FIG. 4) which aligns or otherwise overlaps with the port 55 defined by the rear portion 50 of the main body 12 when the cradle 60 is mounted to the rear portion 50 of the main body 12. In this exemplary embodiment, the main body 12 defines a channel 70 in which the electrical wiring 150 is routed. The channel 70 thus extends from the first cavity 22 defined by the front portion 20 of the main body 12 to the second cavity 52 defined by the rear portion 50 of the main body 12. In this exemplary embodiment, the channel 70 is defined in a bottom surface of the main body 12, extending from the front portion 20, across the right side portion 40, and to the rear portion 50 of the main body 12.

Referring still to FIG. 5B, in this exemplary embodiment, a bottom surface of the left and right side portions 30, 40 of the main body 12 also define a plurality of flex channels 72 that facilitate flexing of the main body 12, so that it can properly drape over the shoulders of the user (as shown in FIGS. 1A-C). In this regard, each respective flex channel may be characterized as an area of the left side portion 30 or the right side portion 40 of the main body 12 having a reduced thickness.

Referring now to FIGS. 1A-C, 2, 4, and 5A-B, in this exemplary embodiment, the carriage 10 further includes a pair of straps 80, 90 configured to secure the main body 12 around the torso of the user. In this exemplary embodiment, each respective strap 80, 82 includes a first strap segment 90, 92 attached to and extending from a side of the front portion 20 of the main body 12 and a second strap segment 84, 94 attached to and extending from a side of the rear portion 50 of the main body. Specifically, in this exemplary embodiment, the front portion 20 of the main body 12 defines, and thus can be characterized as including, a first pair of anchor tabs 23, 24 to which the first strap segment 82, 92 of the straps 80, 90 are secured. Similarly, the rear portion 50 of the main body 12 defines, and thus can be characterized as including, a second pair of anchor tabs 56, 57 to which the second strap segment 84, 94 of the straps 80, 90 are secured. Each respective anchor tab 23, 24, 56, 57 defines an opening 23*a*, 24*a*, 56*a*, 57*a* through which a corresponding strap segment 82, 84, 92, 94 can pass to facilitate securement of the straps 80, 90 to the main body 12. To selectively connect (or mate) the respective strap segments of each strap, in this exemplary embodiment, a distal end of the first strap segment 82, 92 of each strap 80, 90 is provided with a first buckle portion 81, 91 (e.g., a female buckle portion) that is configured to mate with a corresponding second buckle portion 83, 93 (e.g., a male buckle portion) provided at a distal end of a corresponding second segment 84, 94. Of course, the respective straps 80, 90 may be alternatively constructed or secured to the main body 12, or the corresponding strap segments 82, 84, 92, 94 may be alternatively mated without departing from the spirit or scope of the present invention.

One of ordinary skill in the art will recognize that additional embodiments are also possible without departing from the teachings of the present invention. This detailed description, and particularly the specific details of the exemplary embodiment disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A powered air-purifying respirator assembly, comprising:
- a blower assembly, including a fan for drawing air through an air-purifying filter; and
- a carriage, the carriage including
  - a main body configured to be worn by a user, the main body including
    - a front portion defining a first cavity,
    - a rear portion positioned opposite of the front portion and defining a second cavity in which the blower assembly is positioned,
    - a left side portion extending between the front portion and the rear portion, and
    - a right side portion positioned opposite of the left side portion and extending between the front portion and the rear portion;
- a power source positioned within the first cavity and operably connected to the blower assembly;
- wherein the front portion, the rear portion, the left side portion, and the right side portion of the main body of the carriage collectively define a central opening for receiving a head of the user;
- wherein, in use, the front portion of the main body and the rear portion of the main body are configured to be positioned on opposing anterior and posterior sides of the user, the left side portion is configured to rest on one shoulder of the user, and the right side portion is configured to rest on another shoulder of the user; and
- wherein, in use, the power source is configured to be positioned on the anterior side of the user and is substantially centered between the left side portion and the right side portion of the main body of the carriage, while the blower assembly is configured to be positioned on the posterior side of the user and is substantially centered between the left side portion and the right side portion of the main body of the carriage.

2. The powered air-purifying respirator assembly according to claim 1, wherein the power source is housed in a power source housing selectively installed in the first cavity.

3. The powered air-purifying respirator assembly according to claim 2, wherein the power source housing includes a control for controlling operation of the blower assembly, and wherein the front portion of the main body defines a first opening configured to permit entry of the power source housing into the first cavity and a second opening through which the control of the power source housing can be accessed.

4. The powered air-purifying respirator assembly according to claim 2, wherein the power source housing includes a body defining a cavity for receiving the power source and a door configured to transition between an open position providing access to the cavity and a closed position restricting access to the cavity.

5. The powered air-purifying respirator assembly according to claim 1, wherein one of the left side portion and the right side portion of the main body includes a break between a first section and a second section of the one of the left side portion and the right side portion, and wherein the main body is flexible, such that a distance between the first section and the second section of the one of the left side portion and the right side portion can be selectively adjusted.

6. The powered air-purifying respirator assembly according to claim 5, wherein the main body further includes a locking mechanism for selectively connecting the first section and the second section of the one of the left side portion and the right side portion across the break.

7. The powered air-purifying respirator assembly according to claim 6, wherein the locking mechanism includes a hook mounted to the first section of the one of the left side portion and the right side portion and the second section of the one of the left side portion and the right side portion defines an opening for receiving the hook.

8. The powered air-purifying respirator assembly according to claim 1, wherein the carriage further includes a cradle for receiving the blower assembly, and wherein the cradle is mounted to the rear portion of the main body and includes a slot for receiving a first portion of the blower assembly and a one or more cuffs that define a cavity for receiving a second portion of the blower assembly.

9. The powered air-purifying respirator assembly according to claim 8, wherein the cradle is removably mounted to the rear portion of the main body and includes a tab which can be selectively inserted into and locked relative to a slot defined by the rear portion of the main body.

10. The powered air-purifying respirator assembly according to claim 1, wherein the carriage further includes one or more straps positioned on opposing sides of the main body and which, in use, are configured to secure the main body around a torso of the user, wherein each strap of the one or more straps includes a front strap segment attached to the front portion of the main body and a rear strap segment that is attached to the rear portion of the main body and can be selectively connected to the front strap segment.

11. A carriage for a powered air-purifying respirator, comprising:

a main body configured to be worn by a user, the main body including a front portion defining a first cavity for receiving a power source of the powered air-purifying respirator, a rear portion positioned opposite of the front portion and defining a second cavity for receiving a blower assembly of the powered air-purifying respirator, a left side portion extending between the front portion and the rear portion, and a right side portion positioned opposite of the left side portion and extending between the front portion and the rear portion;

wherein, the front portion, the rear portion, the left side portion, and the right side portion collectively define a central opening for accommodating a head of the user; and wherein, in use, the front portion of the main body and the rear portion of the main body is configured to be positioned on opposing anterior and posterior sides of the user, the left side portion is configured to rest on one shoulder of the user, and the right side portion is configured to rest on another shoulder of the user; and wherein, in use, the first cavity for receiving the power source is configured to be positioned on the anterior side of the user and is substantially centered between the left side portion and the right side portion of the main body of the carriage, while the second cavity for receiving the blower assembly is configured to be positioned on the posterior side of the user and is substantially centered between the left side portion and the right side portion of the main body of the carriage.

12. The carriage according to claim 11, wherein one of the left side portion and the right side portion of the main body includes a break between a first section and a second section of the one of the left side portion and the right side portion, and wherein the main body is flexible, such that a distance between the first section and the second section of the one of the left side portion and the right side portion can be selectively adjusted.

13. The carriage according to claim 12, wherein the main body further includes a locking mechanism for selectively connecting the first section and the second section of the one of the left side portion and the right side portion across the break.

14. The carriage according to claim 13, wherein the locking mechanism includes a hook mounted to the first section of the one of the left side portion and the right side portion and the second section of the one of the left side portion and the right side portion defines an opening for receiving the hook.

15. The carriage according to claim 11, and further comprising a cradle for receiving the blower assembly, wherein the cradle is mounted to the rear portion of the main body and includes a slot for receiving a first portion of the blower assembly and a one or more cuffs that define a cavity for receiving a second portion of the blower assembly.

16. The carriage according to claim 15, wherein the cradle is removably mounted to the rear portion of the main body and includes a tab which can be selectively inserted into and locked relative to a slot defined by the rear portion of the main body.

17. The carriage according to claim 11, and further comprising one or more straps positioned on opposing sides of the main body and which, in use, are configured to secure the main body around a torso of the user, wherein each strap of the one or more straps includes a front strap segment attached to the front portion of the main body and a rear strap segment that is attached to the rear portion of the main body and can be selectively connected to the front strap segment.

18. The carriage according to claim 11, wherein the main body defines a channel for receiving electrical wiring of the powered air-purifying respirator, and wherein the channel extends from the first cavity defined by the front portion of the main body to the second cavity defined by the rear portion of the main body.

* * * * *